United States Patent
Ahmed (10) Patent No.: US 10,747,568 B2
(45) Date of Patent: Aug. 18, 2020

(54) SYSTEMS AND METHODS FOR MANAGING A CLOUD COMPUTING ENVIRONMENT

(71) Applicant: Magalix Corporation, Bellevue, WA (US)

(72) Inventor: Mohamed Ahmed, Redmond, WA (US)

(73) Assignee: Magalix Corporation, Bellevue, WA (US)

( * ) Notice: Subject to any disclaimer, the term of this patent is extended or adjusted under 35 U.S.C. 154(b) by 240 days.

(21) Appl. No.: 15/991,781

(22) Filed: May 29, 2018

(65) Prior Publication Data

US 2018/0349168 A1    Dec. 6, 2018

Related U.S. Application Data (60) Provisional application No. 62/512,704, filed on May 30, 2017.

(51) Int. Cl.
| | |
|---|---|
| *G06F 9/455* | (2018.01) |
| *G06F 9/50* | (2006.01) |
| *G06N 3/04* | (2006.01) |
| *H04L 12/24* | (2006.01) |
| *G06N 3/08* | (2006.01) |

(Continued)

(52) U.S. Cl.
CPC ........ *G06F 9/45558* (2013.01); *G06F 9/5077* (2013.01); *G06F 11/3433* (2013.01); *G06N 3/0445* (2013.01); *G06N 3/084* (2013.01); *H04L 41/0806* (2013.01); *H04L 41/0816* (2013.01); *H04L 41/0896* (2013.01); *H04L 41/147* (2013.01); *H04L 43/0876* (2013.01); *G06F 9/5027* (2013.01); *G06F 9/5072* (2013.01); *G06F 11/34* (2013.01); *G06F 2009/4557* (2013.01); *G06F 2009/45562* (2013.01); *G06F 2009/45575* (2013.01); *G06F 2009/45579* (2013.01); *G06F 2009/45591* (2013.01); *G06F 2201/815* (2013.01); *G06N 3/006* (2013.01); *G06N 3/126* (2013.01); *G06N 7/005* (2013.01); *G06N 20/00* (2019.01); *G06Q 10/04* (2013.01);

(Continued)

(58) Field of Classification Search
None
See application file for complete search history.

(56) References Cited

U.S. PATENT DOCUMENTS

| | | | |
|---|---|---|---|
| 7,152,157 B2 * | 12/2006 | Murphy | ............... G06F 9/5077 713/100 |
| 7,730,486 B2 | 6/2010 | Herington | |

(Continued)

OTHER PUBLICATIONS

Piraghaj, Sareh Fotuhi, et al. "Efficient virtual machine sizing for hosting containers as a service (services 2015)." Jun. 27, 2015. IEEE World Congress on Services. (Year: 2015).*

(Continued)

*Primary Examiner* — Lewis A Bullock, Jr.
*Assistant Examiner* — Gilles R Kepnang (57) ABSTRACT

The disclosed technology relates to cloud computing and, more specifically, to a cloud computing platform that manages cloud infrastructure to provide autonomous management of containers hosting applications. Based on prediction computations, the disclosed technology can scale up a VM or container, scale down a VM or container, shutdown a VM or container, change the location of a container, open a new container, or close a container.

6 Claims, 3 Drawing Sheets

(51) Int. Cl.
*G06F 11/34* (2006.01)
*H04L 12/26* (2006.01)
*G06N 3/12* (2006.01)
*G06N 3/00* (2006.01)
*G06N 20/00* (2019.01)
*G06N 7/00* (2006.01)
*H04L 29/08* (2006.01)
*G06Q 10/04* (2012.01)

(52) U.S. Cl.
CPC ......... *H04L 41/5009* (2013.01); *H04L 43/08* (2013.01); *H04L 67/10* (2013.01)

(56) References Cited

U.S. PATENT DOCUMENTS

| | | | |
|---|---|---|---|
| 8,015,563 | B2 | 9/2011 | Araujo, Jr. et al. |
| 8,458,717 | B1 | 6/2013 | Keagy et al. |
| 9,858,123 | B1 | 1/2018 | Dailianas et al. |
| 9,888,067 | B1 | 2/2018 | Yemini et al. |
| 10,091,070 | B2 * | 10/2018 | Chopra ............... H04L 41/00 |
| 10,102,055 | B1 * | 10/2018 | Gaber ................. G06F 11/079 |
| 2009/0158275 | A1 | 6/2009 | Wang et al. |
| 2014/0310714 | A1 * | 10/2014 | Chan .................... G06F 9/4881 718/102 |
| 2016/0034809 | A1 * | 2/2016 | Trenholm ............ G06F 9/5027 706/20 |
| 2016/0321588 | A1 * | 11/2016 | Das ................. G06Q 10/06315 |
| 2016/0330277 | A1 * | 11/2016 | Jain ..................... H04L 67/1095 |
| 2017/0126506 | A1 * | 5/2017 | Padala .................... H04L 43/08 |
| 2017/0235596 | A1 * | 8/2017 | Vankadaru .......... G06F 9/45558 718/1 |
| 2017/0249763 | A1 * | 8/2017 | Garvey ............. G06Q 10/0631 |
| 2017/0353361 | A1 * | 12/2017 | Chopra ................. H04L 41/00 |
| 2019/0227847 | A1 * | 7/2019 | Jha ........................ G06N 20/00 |

OTHER PUBLICATIONS

Das, Sudipto, et al. "Automated demand-driven resource scaling in relational database-as-a-service." Jun. 26, 2016. Proceedings of the 2016 International Conference on Management of Data. (Year: 2016).*

Hegde, Aditya, et al. "Scope: A decision system for large scale container provisioning management." Jun. 27, 2016. IEEE 9th International Conference on Cloud Computing (CLOUD). (Year: 2016).*

* cited by examiner

SYSTEMS AND METHODS FOR MANAGING A CLOUD COMPUTING ENVIRONMENT

CROSS-REFERENCED APPLICATION

The application claims priority to U.S. Provisional Application No. 62/512,704 filed on May 30, 2017 and titled "Systems and Methods for Managing a Cloud Computing Environment," all of which is incorporated by reference herein for its entirety for all purposes.

TECHNICAL FIELD

The disclosed technology relates to cloud computing. More specifically, the disclosed technology relates to a computing platform that manages a container or virtual machine hosting the container.

BACKGROUND

As the growth of virtual machines and containers continues, software developers ("developers") have struggled to optimize the performance of virtual machines, containers, and applications. For example, a developer may unintentionally under provision a container because the demand for an application running on the container increases unexpectedly at peak hours to a level that a host virtual machine ("VM") or container is not capable of effectively handling. Not capable of effectively handling means the container's processing power, memory, or input/output capability are too low for running an application and the application will likely crash or function poorly (e.g., frequent errors). If the peak demand continues to grow without the developer knowing, the growth exacerbates the under provisioning problem. Accordingly, although under provisioning can save resources such as memory and processing power, it can cause customer disappointment.

In contrast to under provisioning a container or VM, developers may overprovision a container or VM to handle a high workload during peak hours. Even though the peak workload may last only a few hours, the overprovisioned VM or overprovisioned container continues to run throughout the day, month, or even year. Such overprovisioned VMs and containers can generate more heat or deplete resources (e.g., processing power, memory, or other computer resources). Further, because costs for a VM or container are generally based on rental rates regardless of utilization, over provisioning increases cost for companies, developers, and even customers.

Additionally, although developers can include an auto-scaling feature that provisions a new VM or new container every time peak load increases, the size of a network can grow uncontrollably, which can be costly or even make the network underutilized outside of peak hours. Accordingly, a need exists to address these problems and provide additional benefits.

BRIEF DESCRIPTION OF THE DRAWINGS

The following drawings illustrate some implementations of the disclosed technology.

The drawings are not to scale. Some components or operations can be separated into different blocks or combined into a single block for the purposes of discussion for implementations of the disclosed technology.

DETAILED DESCRIPTION

The disclosed technology includes a computing platform that manages a container running an application or a VM hosting the container. The computing platform can manage the container or the VM based on several factors such as a service level agreement (SLA), usage parameters (e.g., container processor usage, container memory usage, container input/output usage), and a key performance indicator (KPI) of an application running on the container (e.g., latency, error rate). The KPI can also be referred to as a "performance indicator" that includes the performance of a container or an application running on the container.

As a general overview, the computing platform receives data for a container running an application at an initial frequency (e.g., every second or every minute). The computing platform uses these data at the initial frequency to determine a forecast for a future performance of the container. The forecast performance can include the likelihood and expected usage of the processor, the memory, and the I/O of the container for a time in the future. In some implementations, the forecast also incorporates a KPI or SLA parameter for the future performance of the container in its forecast. In other implementations, the computing platform omits KPI and SLA values and forecasts solely based on usage data for a container.

Based on the forecast, the computing platform can scale up or down the container to improve (e.g., optimize) the performance of the container in the future. Scaling up or down can include increasing or decreasing the memory, the processor, or the I/O for the container or its host virtual machine. The computing platform can also move the container to another virtual machine, which may include shutting down the previous host virtual machine.

As part of forecasting, the computing platform can use artificial intelligence (AI) algorithms to forecast the performance of a container running an application on a VM. For example, the computing platform can use a long short term memory (LSTM) neural network algorithm to forecast the performance of a container running an application. The computing platform can use a feed forward neural network (FFNN) to forecast the performance of a container running an application, where back propagation can be included (e.g., developer decisions). The computing platform can also use a content neural network (CNN) or recurrent neural network to forecast the performance an application running on a container.

For forecasting, the computing platform feeds usage data for a central processing unit (CPU), memory, and input/output ("I/O") for a container into the AI algorithms (e.g., LS™ or FFNN) at a single resolution or multiple resolutions. Usage data is generally the usage or performance of the CPU, the memory, and the I/O for a container running an application. The computing platform can feed the usage data at different resolutions (also referred to as "frequencies") such as 1 second, 30 seconds, 1 minute, 2 minutes, 5 minutes, 10 minutes, 30 minutes, 1 hour, 1.5 hours, 2 hours, 6 hours, 12 hours, daily, weekly, monthly, or even longer.

The computing platform can receive usage data at each resolution such that the computing platform can compute trends for high resolution (e.g., 1 minute) or a low resolution (e.g., 12 hours). For example, the computing platform can determine an hourly trend for the usage of a container as well as a daily or weekly trend for the container. The computing platform can use the short and long term trends to make a single decision for adjusting a container or VM hosting the container. In some implementations, the computing platform can average every 60 points from the 1-second resolution to generate data points for a 1-minute resolution. As another example, the computing platform can receive usage data every minute and use that to determine trends for 1 hour (e.g., average the 60 data points for the 1-minute resolution to get a one 1-hour data point resolution). In general, the computing platform can average points for one resolution (e.g., the 1-minute resolution) to determine a resolution for another resolution (e.g., for the 5-minute frequency, take the average value of the 5 previous 1-minute resolution values). The process of averaging can also be referred to as down sampling.

In some implementations, the computing platform can use an LSTM and FFNN simultaneously or separately. For example, the computing platform can use the LSTM algorithm for one resolution and an FFNN for another resolution. The decision to use one algorithm versus another algorithm can be based on a higher confidence for a resolution with one algorithm versus another algorithm. For example, the LSTM may have a higher confidence value for data points at one resolution compared to the FFNN at the same resolution or another LSTM at another resolution.

The computing platform can determine a confidence value with a forecast. The confidence value is a likelihood measure that the generated forecast will match an actual workload for the container or application. For example, a 70% confidence value is a relatively medium confidence that the forecast will match the actual workload. The higher the confidence value, the more likely that the forecast will match the generated workload.

In some implementations, after receiving 200 data points for container usage, the AI algorithms can output confidence values of 80% or more. This 200 data points or 80% confidence value is considered a threshold value that the computing platform can use to decide to scale up, scale down, or move a container. For example, if the frequency of usage data is every minute, it would take 200 minutes to reach a threshold for a relatively high confidence for the 1-minute resolution. The computing platform can use a 5-minute frequency, and after 1000 minutes (e.g., 16.67 hours) or 200 data points, the computing platform can have a forecast and with a 80% confidence threshold for the 5-minute resolution.

Based on the forecast, the computing platform can transmit instructions to a container to scale up, scale down, or move to another VM. In some implementations, the computing platform can also determine the container should maintain its current configuration based on the forecast. The computing platform can also shut down a single container, shut down multiple containers, shut down or open a new VM, or shut down or open multiple VMs based on a forecast for the container.

Prior to forecasting, the computing platform receives relevant data for the container. The computing platform can identify containers that include an application and retrieve the identified container images. In some implementations, the computing platform can receive a manifest file that specifics a KPI and an associated preferred value or value range for a KPI or an SLA. The computing platform can also query a developer using a graphical user interface to determine a KPI and a preferred range for the KPI. For example, the computing platform can receive a KPI that is latency of an application programming interface (API) for application running on the container, where the maximum latency value (e.g., preferred value) is limited to 800 milliseconds.

In some implementations, the computing platform updates its AI algorithms with developer's decisions. For example, the computing platform can use feedforward neural network algorithm and include a developer's decisions in back propagation. The computing platform can continuously, frequently, or sporadically receive inputs from developers about the robustness of decisions. The robustness refers to the quality of the decision and the decision being correct. Based on this developer input, the computing platform determines developer styles to operate an application. Over time the computing platform aggregates from a single developer or multiple developers and uses such learning as feedback to run an application. For example, the computing platform can determine that a container needs double its CPU or memory size. The computing platform can present this information to a developer for review, and the developer can respond by increasing the CPU or memory size by a factor of 4 instead of a factor of 2. The computing platform can learn from the developer's decision and it can apply this learning to a feature scenario. For example, the computing platform can quadruple CPU power or memory size for a container in a similar scenario.

The computing platform can also include a cluster scanner (also referred to as a "cluster agent"). The cluster scanner is configured to scan a cluster or clusters, where a cluster includes a VM and a container running an application. The cluster scanner can determine information about the clusters such as structure, number of VMs or containers, names of VMs and containers, and parameters associated with the VMs or containers (e.g., applications running, CPU usage, memory, input/output (I/O) usage). The cluster scanner can scan clusters in a known network or an unknown (e.g., a new customer or new client). The cluster scanner can also transmit parameters or metrics from one cluster to the computing platform. For example, the cluster scanner can cause a cluster to regularly send (e.g., push information every minute) to the computing platform. In some implementations, the cluster scanner exists on both the computing platform and the cluster it intends to scan. The cluster scanner is described in more detail in FIG. 2.

The disclosed technology is rooted in cloud computing and computer technology, and it solves one or more technical problems with one or more technical solutions. For example, the computing platform reduces the underutilization of VMs and containers, which reduces the underutilization of memory, processing power, or input/output of containers and VMs. Reducing underutilization reduces the production of heat from excessive processing and reduce cost of maintaining an application. These benefits are increased for large networks of VMs and containers (e.g., more than 100 VMs or more than 1000 containers). Additionally, the computing platform addresses the technical problem of application reliability because the computing platform increases the probability that application is running with appropriately-sized resources, which reduces downtime or errors.

A further technical solution of the disclosed technology is that it is agnostic to operating system (OS), application type, or programming language running the application, because the computing platform can access information for any type of container (e.g., public or private), running any type of application, on any type of VM. The computing platform reads metrics at an OS level of a container and thus does not need to know the programming language for the application running on the container or specific information about the container. Thus, the computing platform can improve the performance of an application without receiving metrics from the application itself, which would require instrumentation from the application.

Additionally, the computing platform can apply resource allocation at the OS level only, which enables adjustment without direct access to an application. For example, the computing platform can instruct the OS (e.g., Linux™ or Windows™) to allocate more memory to a container running an application. The container receives these changes and allocates the additional memory without having to adjust the application directly. As a result, an application can continue to run while still being monitored and adjusted by the computing platform. Also, if the computing platform determines it will adjust a VM running an application, the computing platform can make an API call to VM provider (e.g., the cloud provider) to allocate or de-allocate VMs for applications.

Yet another technical solution of the computing platform is that it integrates the intelligence of many developers with AI algorithms to adapt to a developer's style. The computing platform can reduce the amount of time developers spend monitoring application resources and determining how applications adapt to different workloads. Additionally, the computing platform reduces the cost of running a VMs and containers because it incorporates the cost parameters from a SLA.

In the following disclosure, the following terms have a defined meaning. Service Level Agreements (SLAs) specify the expected performance characteristics between a service provider and a client. For example, a SLA can specify the cost and parameter for a VM and the expected performance of that VM. A SLA can include various resource requirements and costs for a container, computer, or application. The SLA can include service-level parameters that are requirements or described performance parameters for a VM or container. For example, a service-level parameter can be many hours an application can be down per month or a minimum number of errors detected at container for satisfactory performance.

KPIs or performance indicators are generally values that a computer can use to determine the performance of a computer, VM, container, or application. KPIs can be latency, bandwidth, throughput, packet loss, frequency of errors, error rate, number of errors detected, searched files per unit of time (e.g., second or minute), database entries accessed or modified per minute, or a user-defined KPI. Latency relates to the maximum amount of time between the arrival of a request and the completion of that request. For example, latency can be related to call rate latency in case of Hypertext Transfer Protocol (HTTP) endpoints used by an application. A user-defined KPI is a value provided by a developer that indicates performance of the system. A user-defined KPI can be time required to perform a backup of a system or time required to analyze a feed of information. Further, the term "machine" can refer to a virtual computing device or physical computing device capable of computing or making decisions. A machine can be a computer, VM, container, or a combination thereof.

Figure 1:
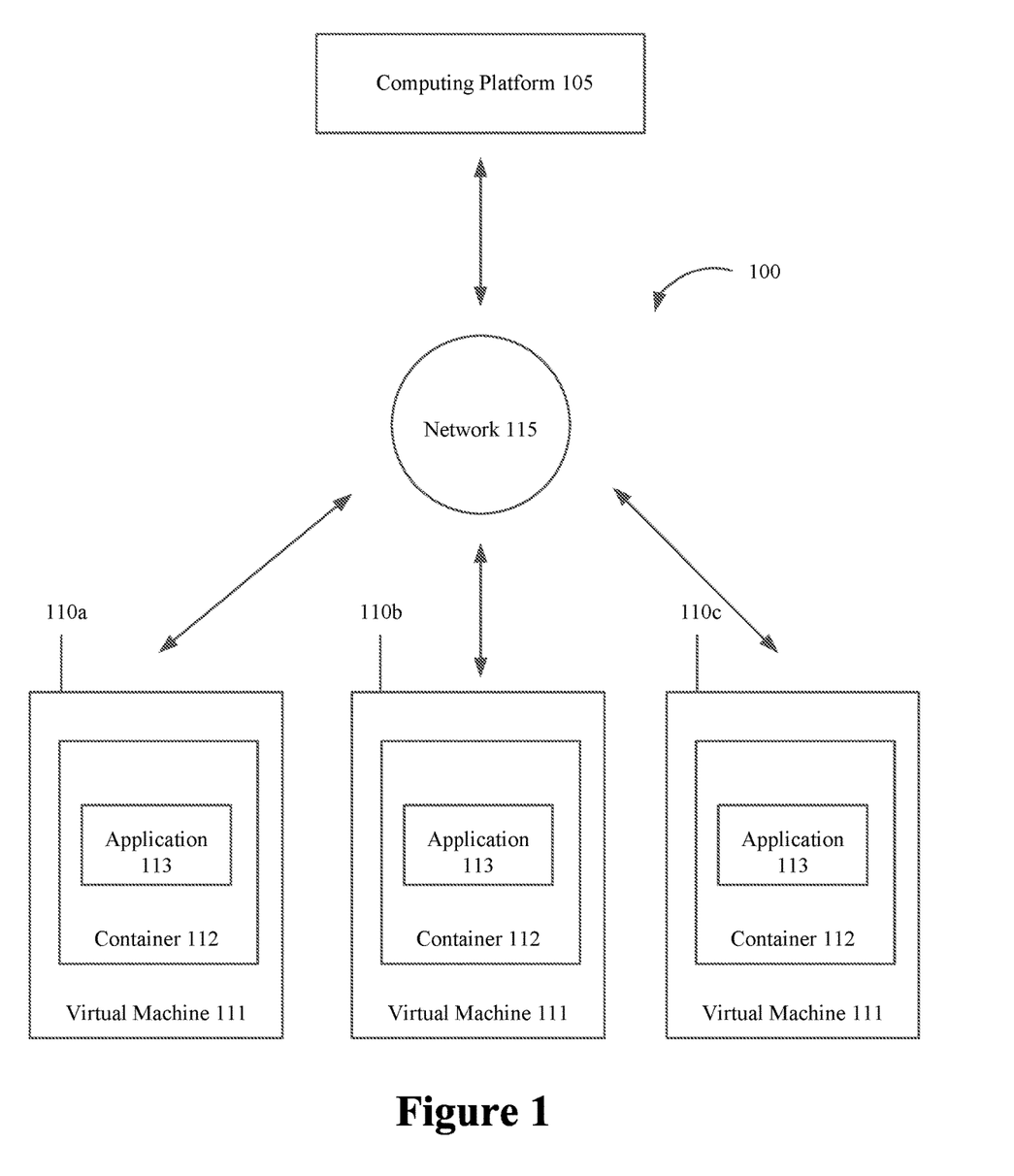
FIG. 1 illustrates a schematic overview of a cloud computing environment in accordance with some implementations of the disclosed technology.

FIG. 1 illustrates a schematic overview of a cloud computing environment 100. The cloud computing environment 100 includes a computing platform 105, clusters 110*a-c*, and a network 115. Also, it should be noted that a cluster can refer to a single cluster or a group of clusters. In some implementations, the cloud computing environment 100 can have tens, hundreds, thousands, or even more clusters. The clusters can be part of a company's network or part of a cloud provider's network. Each component of the cloud computing environment 100 is described in more detail below.

The computing platform 105 is a combination of software and hardware configured to monitor and modify the clusters 110*a-c*. The computing platform 105 can scale up a VM or a container running an application. As an example, the computing platform 105 can send instructions to the clusters 110*a-c* that cause a container to increase its memory, decrease its memory, shutdown, or move to a different host VM. The computing platform 105 can monitor and modify a single container running a single application hosted by a single VM or it can monitor and modify multiple containers running one or more applications hosted by multiple VMs. The computing platform 105 is described in more detail in FIG. 2.

The clusters 110*a-c* are a VM 111 hosting a container 112 running an application 113. The VM 111 is an abstraction of physical hardware. The VM is comprised a specification and configuration files and is backed by the physical resources of a host (e.g., a computer). The VM 111 can provide the same or similar functionality as physical hardware. A hypervisor, which is software between the physical hardware and VM, enables a single VM or multiple VMs to run on a single machine. The VM 111 includes a full copy of an OS and it can also include one or more applications, binaries, and libraries.

The container 112 is a lightweight, stand-alone, executable package piece of software that includes information to run the software, code, runtime, system tools, system libraries, and settings. The container 112 is considered "lightweight" because it is not required to have an entire OS like a physical computer or VM. The container 112 can be used with both Linux™ and Windows™ or another operation system. The container 112 is an abstraction at an application layer that packages code and dependencies together. In some implementations, multiple containers 112 can run on the same VM 111 and share an OS kernel.

The application 113 is a software run by the container 112. The software can be related to providing a service such as email or software for developing code. In some implementations, the application 113 is divided into services, where each service runs a process and manages its own database. A service can generate alerts, log data, support user interfaces (UIs), handle user identification or authentication, and perform tasks related to using software. The services can relate to computing software, software development software, social media, and other types of software.

In some implementations, the application 113 is a microservice. The micro service can provide development teams with a decentralized approach to building software. Also, microservices enable each service to be isolated, rebuilt, redeployed, and managed independently. A specific service can be tested, restarted, patched, or redeployed as needed, independent of other services. Accordingly, the applications 113 show in FIG. 1 can be an application or a microservice. The applications 113 can be located on a single container 112 or multiple containers 112. The application 113 can serve a business function such as: cloud computing operations, photo or video editing, user management, user roles, e-commerce cart, search engine, or social media logins. In some applications, the applications 113 can have different services where each service is written in different programming languages or uses different databases.

The network 115 enables the computing platform 105 to communicate with the clusters 110a-c (e.g., over the internet, in a cloud). The network 115 can be a Wi-Fi™ network, a wired network, or a network implementing any of the Institute of Electrical and Electronic Engineers (IEEE) 802.11 standards. The network 115 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some implementations, the network 115 can include communication networks such as a Global System for Mobile (GSM) mobile communications network, a code/time division multiple access (CDMA/TDMA) mobile communications network, a 3rd, $4^{th}$, or 5th generation (3G/4G/5G) mobile communications network (e.g., General Packet Radio Service (GPRS)) or other communications network such as a Wireless Local Area Network (WLAN).

Figure 2:
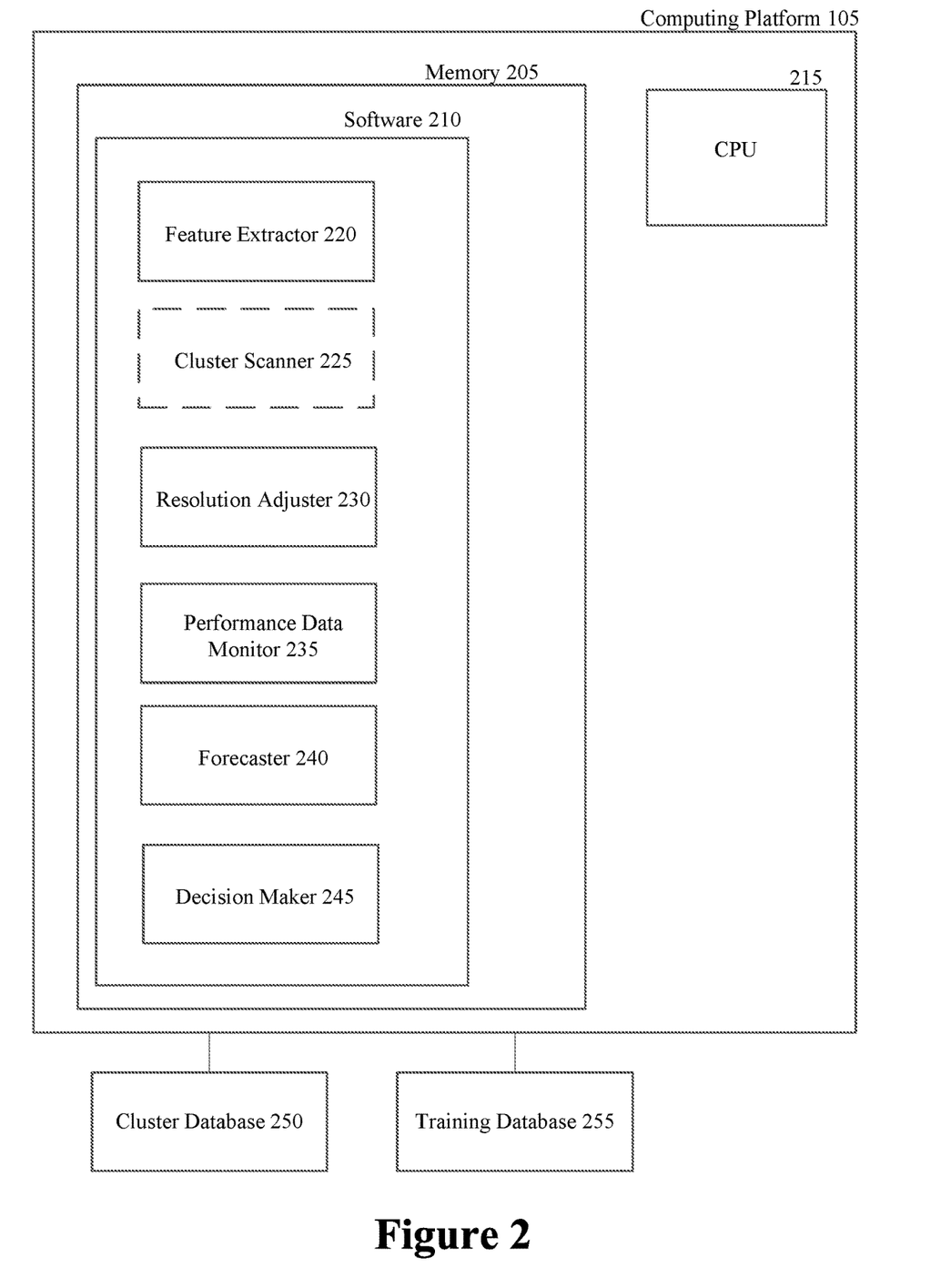
FIG. 2 illustrates a schematic architecture for the computing platform from FIG. 1 in more detail in accordance with some implementations of the disclosed technology.

FIG. 2 illustrates a schematic block diagram of the computing platform 105 from FIG. 1 in more detail. The computing platform 105 includes a memory 205, software 210, and a CPU 215. The memory 205 stores instructions for executing software 210. The memory 205 stores software 210 comprised of one or more modules and data utilized by the modules. The modules perform certain methods or functions of the computing platform 105 described herein, and can include components, subcomponents, or other logical entities that assist with or enable the performance of some these methods or functions. For example, the modules can store algorithms that can be executed by the module to carry out an operation to adjust or monitor the cloud computing environment 100. In some implementations, the computing platform 105 is divided or separated among several computing devices (e.g., part of it exists on one server and another part exists on another server).

The CPU 215 is a processor that includes special-purpose hardware such as application specific integration circuits (ASICS), programmable logic devices (PLDs), field-programmable gate arrays (FPGAs), programmable circuitry (e.g., one or more microprocessors microcontrollers), Digital Signal Processor (DSP), appropriately programmed with software and/or computer code, or a combination of special purpose hardware and programmable circuitry. In some implementations, the computing platform 105 has multiple CPUs, where the multiple CPUs can be physically coupled to a single computing device or separated on to different computing devices (e.g., distributed among computers in a network). The CPU 215 is configured to run content neural networks, LSTM, and FFNNs.

The software 210 includes a feature extractor 220, cluster scanner 225 (shown with a dashed line and referred to as a "cluster agent"), a resolution adjuster 230, a performance data monitor 235, a forecaster 240, and a decision maker 245. This software can be individually or collectively referred to as a "model" or "modules", and a module or modules can be the means for the computing platform to carry out operations.

The modules can also communicate with a cluster database 250 and training database 255. Although not shown in FIG. 2, the computing platform 105 can include other modules such as a graphical user interface model, which can be configured to display analytical information for a developer or engineer monitoring the cloud computing environment 100 and the computing platform 105. Each of the modules is described in more detail below.

The feature extractor 220 is configured to extract features from a cluster or clusters. Features include data that defines the nature of a container in a cluster or other information about the container and application or applications running on the cluster. Features can include image definition attributes, such as name, repository, private image, public image, size, label, OS, base image, or container deployment data, such as open ports details, health endpoint, or environment variables. A container can have layers, where each layer is a file generated from running a command. Each container has an image with readable or writeable layers on top of read-only layers. The contents of each container layer can be read or accessed from the container host (e.g., Docker). The feature extractor 220 can pull or receive each layer of a container, which is also referred to as pulling or receiving a container image.

The feature extractor 220 can also determine if a container image is a private image or a public image. In some implementations, the feature extractor 220 determines whether a container is a public image by comparing the image, the image layer, or the image format to known public images (e.g., available public image layers). In other implementations, the feature extractor determines a container image is a private image because it cannot find a known public image or layer that is not associated with a public container format.

Features can also include application related details such as number of other containers, number of services, or KPI data for an application or container. The feature extractor 220 can store extracted features in the cluster database 250 for later retrieval during the forecasting or decision making operations (e.g., FIG. 3). In some implementations, the feature extractor 220 determines a VM or VMs hosting the container, specification of the VM or VMs, a container's initial CPU, memory, and I/O needs. The features can be collectively referred to as "performance data" or "usage values". The feature extractor 220 can communicate performance data to the performance data monitor 235.

The feature extractor 220 can also determine if a container is memory intensive, CPU intensive, or I/O output intensive. Intensive generally means the that a function or resource is more important relative to another resource. For example, a CPU intensive container generally has a requirement that its CPU provide enough resource as compared to its memory or I/O. VMs are generally provided to accommodate intensive demands. For example, a cloud provider provides CPU intensive VMs or memory intensive VMs. The feature extractor 220 can determine whether a container or VM has an intensive requirement. In some implementations, the computing platform modifies a container based on its intensity. For example, if computing platform determines that container needs to be scaled up to meet a forecasted performance and the container is a CPU intensive container, the computing platform will likely increase the CPU instead of increasing the memory or I/O of the container.

The cluster scanner 225 is a module that can scan a cluster to determine the structure of cluster. The cluster scanner 225 can exist on the computing platform 105 entirely or it can exist on a cluster (the dashed lines around the cluster scanner 225 are used to emphasis this feature). For example, the computing platform 105 can transmit the cluster scanner 225 to a new network or system of VMs hosting containers. The cluster scanner 225 can scan the cluster for existing namespaces or pods. The cluster scanner 225 can create structures at a "regional cluster", at the client's cluster, to push containers metrics to the cluster database 250 or computing platform 105. In some implementations, the cluster scanner 225 exists on both the computing platform 105 and the cluster it intends to scan. A user can install the cluster scanner 225 locally. In some implementations, the cluster scanner operates at the OS level only.

The resolution adjuster 230 adjusts a time for when the feature extractor, the cluster scanner 225, or the performance data monitor 235 (see below) receive, request, or process data. The resolution adjuster 230 can also determine time parameters to read information from containers and change the time parameters to increase or decrease resolution of reading the parameters. The resolution adjuster 230 can cause use different resolutions or frequencies such as 30 seconds or less, 1 minute, 5 minutes, 30 minutes, 1 hour, 24 hours, 1 days, 1.5 days, 2 days, or 1 week. The different time granularity can also be referred to as "frequency", where an initial frequency can be a first frequency used for collecting data (e.g., 1 second or 1 minute). The initial frequency can also be used to determine trends at other frequencies (e.g., 1-minute data points used to determine 2-minute data points or 12-hour data points by averaging.

In some implementations, the resolution adjuster 230 can average data from one frequency (e.g., 1 minute) to "down sample" to receive data for another frequency (e.g., 5-minute frequency). If the resolution adjuster 230 has data for every minute, it can average 5 points to determine data for the 5-minute resolution or it can average 10 points to determine data for a 10-minute resolution or frequency. The resolution adjuster can average or down sample for all frequencies starting (e.g., from 1.5 minutes to days or even weeks). In some implementations, the initial frequency is a first frequency and a second frequency is generated by averaging points from the first frequency. The second frequency can be longer than the first frequency (e.g., 5 minutes for second frequency versus 1 minute for first frequency).

The resolution adjuster 230 can also determine as other modules in determining confidence intervals and confidence values. The confidence value is a percentage to measure a likelihood that a generated forecast value will match the actual performance of a container. The higher the confidence value number the more likely the forecasted value for a container will match an actual workload for the performance of the container or application. In general, a confidence of 80% is achieved if the resolution adjuster 230 can provide 200 data points to the forecaster 240. Accordingly, a threshold for confidence is defined as the minimum data points to get 200 data points or 80% confidence. For example, if the resolution adjuster 230 determines a resolution of 1 minute, it would require 200 minutes (or 3.33 hours) to acquire 200 data points for 80% confidence for the 1-minute resolution. If the resolution adjuster 230 uses a 5-minute resolution to get 80% confidence that would require collecting information for at least 1000 minutes (or 16.67 hours). Depending on whether the forecaster wants to determine a short (e.g., less than 1 hour) trend or a long (e.g., greater than 1 hour), the resolution adjuster 230 can adjust a confidence interval, e.g., by acquiring more enough data to reach 200 data points.

The performance data monitor 235 collects performance measure parameters and performance data related to a container or containers at resolutions accordingly to the resolution adjuster 230. The performance data monitor 235 collects this data while a VM, container, or application is running. In some implementations, the performance data monitor 235 collects CPU usage, memory usage, and I/O usage for a container running an application at intervals specified by the resolution adjuster 230 (also referred to as "usage parameters").

In addition to collecting the performance data, the performance data monitor 235 can also collect a performance measure parameter such as a KPI like latency at the same frequency as for collecting the performance data. In some implementations, the performance data monitor 235 converts collected information into internal or native formats that can be used in forecasting.

By communicating with the performance data monitor 235 and the resolution adjuster 230, the forecaster 240 can receive data for running containers and applications to determine repeatable patterns and forecast a performance value for an application or container with a confidence value. The algorithms can output forecasted values for the container such as projected memory, CPU, or I/O values for a time based on the previous period time. The forecaster 240 can use independent a LSTM neural network or FFNN to forecast for different or the same resolutions. The forecaster 240 can communicate with the performance monitor 235 to receive usage parameters and KPI values, and then the forecaster 240 can feed these data points into an LSTM, FFNN, or content neural network.

The decision maker 245 determines when and how to adjust a container, application, or VM hosting the container running the application. The decision maker 245 considers the confidence intervals and forecasts from the forecaster 240. Based on these forecast, the decision maker 245 identifies applications, VMs, or containers it can be scale up, scale down, shutdown, or open to keep the application running according to its SLA (e.g., optimize cost). The decision maker 245 can have a first confidence interval associated with a first frequency and a second confidence interval associated with a second frequency. In some implementations, the decision maker 245 sends instruction that operate only at the OS level. Also, if the decision maker 245 receives a forecast for a first and second frequency, where the first forecast is based on shorter frequency than the second frequency, the decision maker 245 can combine the forecasts. For example, the decision maker 245 can determine that a container needs to increase its CPU during a 2 hour period on Friday based on a first forecast value and it can also determine that the container needs to increase its CPU based on weekly second forecast value. The decision maker 245 can combine these forecasts and make a single decision (e.g., increase the CPU to an amount that is sufficient for the first and second forecast).

The decision maker 245 can transmit control instructions to a cluster that cause a container within a VM to increase its memory or processing power (e.g., scale up). In other implementations, the decision maker 245 transmits control instructions that cause the container to scale down by decreasing its memory or processing power. The control instructions can also cause a container to move from a first VM to a second VM. For example, if the forecaster 240 determines that a container needs to scale up to a size that is too large for a VM, the decision maker 245 can send instructions to a cluster hosting a container that a new VM needs to be opened to host the container or the container needs to be moved to a VM that has the appropriate resources for the container to run at an improved (e.g., optimal) rate.

The computing platform 105 can access the cluster database 250 or the training database 255. The cluster database 250 can store features related to clusters, applications, containers, VMs, or other parameters. The training database 255 can store information regarding previous decisions (e.g., to scale up or down a container). The training database 255 can be reviewed by a developer or used as further training data for the forecaster. In some implementations, the training database 255 also stores decisions from a developer, where the developer made the decisions before the decision maker 245 send instructions or after the decision maker 245 acted. For example, a developer decision can override the control instructions, and training database 255 can store this information. In some implementations, the computing platform can learn from this overriding decision and use it to enhance its next decision (e.g., adding weight to a neural network algorithm calculating step). For example, the computing platform can adjust one of the AI algorithms to include back propagation, where part of the back propagation is the developer's decision.

As shown below, Table 1 illustrates an example of the computing platform 105 adjusting three containers. The left column of Table 1 shows containers 1, 2, and 3, which are each running an application; the middle column shows that the computing platform 105 has determined a current values for the CPU, memory, and I/O for each container (usage parameters); and the right column shows a result of the computing platform sending control instructions that modify the three containers based on forecasting. Container 1 is a balanced CPU and memory container and containers 2 and 3 are memory intensive containers.

For Table 1, the performance indicator is latency for an applicant's API and the maximum latency for the application 800 milliseconds. The historic calls per second for the applicant's API endpoint is 200 calls/second for the containers (e.g., the middle column) at current setting.

After the computing platform monitors the three containers for a period at a resolution (e.g., every minute for 10 hours), it adjusts the containers based on a forecast to keep the containers performing in accordance with the KPI. As shown in the right column, the computing platform modified containers 1, 2, and 3 (e.g., container 1 increased its vCPU from 1 vCPU to 2 vCPU) (changes are shown with underline). The result of the new configurations and forecast is that the anticipated KPI will be 400 calls/second, and the latency is below 800 milliseconds.

TABLE 1

|  | History | New |
|---|---|---|
| Container 1 |  |  |
| CPU | 1 vCPU | 2 vCPU |
| Memory | 2 GB | 4 GB |
| Network I/O | 10 Mbits/second | 10 Mbits/second |
| Container 2 |  |  |
| CPU | 2 vCPU | 2 vCPU |
| Memory | 6 GB | 5 GB |
| Network I/O | 10 Mbits/second | 10 Mbits/second |
| Container 3 |  |  |
| CPU | 3 vCPU | 4 vCPU |
| Memory | 1 GB | 2 GB |
| Network I/O | 10 Mbits/second | 10 Mbits/second |

Figure 3:
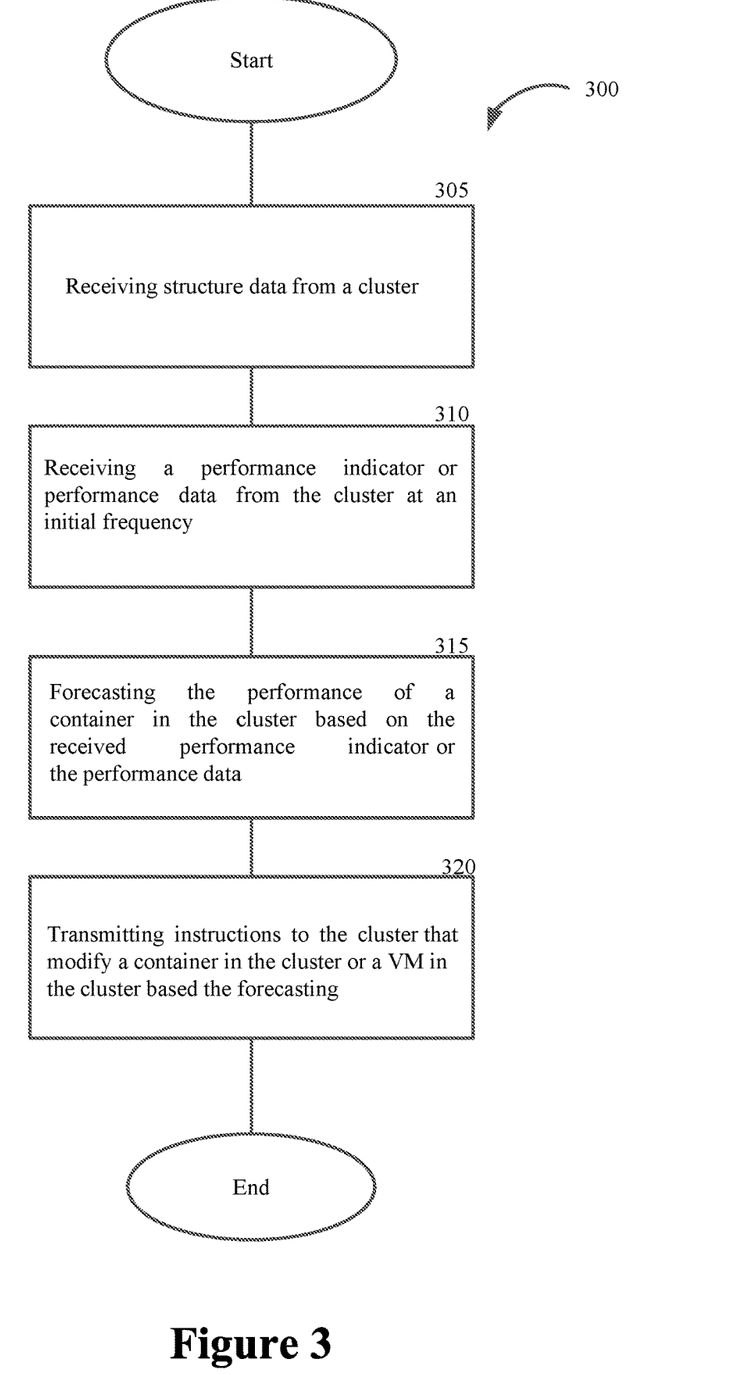
FIG. 3 illustrates a process for implementing operations to manage the cloud computing environment in accordance with some implementations of the disclosed technology.

FIG. 3 illustrates a process for implementing a set of operations to manage the cloud computing environment 100. The computing platform 105 (FIG. 1 and FIG. 2) can perform the operations for the process 300. The process 300 generally includes identifying containers that include an application or applications, retrieving the identified container images, analyzing the identified container images based on parameters (e.g., CPU size, memory size, or I/O), monitoring at different resolutions the performance of the containers based on parameters such as API latency, error rate, and other parameters associated with application performance. Based on these monitored data, the computing platform can forecast the performance of a container. And based on the forecast, the computing platform can transmit instructions to a cluster to modify a container or VM running the container. The instructions can be made to keep the application running according to its SLA and to reduce spending (e.g., minimize spending), scale up or down the container, or move the container to another virtual machine. The process 300 can begin at cluster receiving operation 305 and continue to a performance receiving operation 310.

At the cluster receiving operation 305, the computing platform receives structure data from a cluster. Structure data can be features that are described in FIG. 2. For example, features can include data that defines nature of a container in cluster, what the cluster is doing, or other information about the container and applications running on the cluster. Features can include image definition attributes, such as name, repository, private or public image, size, label, OS, base image, or container deployment data, such as open ports details, health endpoint, environment variables, or namespace for the container and its host VM. Features can also include application related details such as number of other containers, number of services, or KPI data for an application or container.

In some implementations, the feature extractor 220 (FIG. 2) pulls container images to perform the cluster receiving operation 305. The developer can instruct the feature extractor to extract features from a cluster or a customer can grant the feature extractor access to a cluster or clusters to begin the cluster receiving operation 305. Alternatively, the computing platform 105 can automatically start the cluster receiving operation 305 by determining a cluster with highest cost or highest resource consumption. The computing platform 105 can begin the cluster receiving operation 305 in a start to finish approach, where it starts with a first cluster and continues until all clusters have been received. Also, in the cluster receiving operation 305, the computing platform 105 can assign each container a unique ID for tracking.

In some implementations of the cluster receiving operation 305, the computing platform 105 determines whether a container image is public or private. The computing platform 105 can determine that a container image is public based on known public formats of the container (e.g., available at Docker). If the computing platform 105 determines that an image is private image, it can store this information can begin to gather metrics about the container based on the private image.

At the performance receiving operation 310, the computing platform 105 collects usage values. The usage can be received from the containers at an initial frequency (e.g., 1 minute, 10 minutes, etc.). For example, the computing platform 105 can receive CPU usage, memory usage, I/O usage, and a KPI for an application running on container every 1 minute. The usage data can be stored in cluster database and categorized according to the features extractor naming. The computing platform can continue to adjust the resolution from 1 minute to 2 minutes or longer (e.g., 5 minutes, 10 minutes, 15 minutes, 1 hour). The resolution adjuster 230 can continue assist the computing platform in adjusting the resolution. The usage data is collected at different resolution to provide for more accurate forecasting in the forecasting operation 315 and to provide short or long-term trends in a forecast.

At forecasting operation 315, the computing platform 105 can use the usage data or KPI to determine a forecast for a container. In some implementations, the computing platform 105 uses both the usage data and the KPI value and in other implementations the computing platforms uses only the usage data to make a forecast.

In some implementations, the computing platform 105 determines an actual value for the forecast, where the value refers to forecasted workload of the application or container. In some implementations, the computing platform uses the LSTM neural network algorithm, the FFNN, or another content neural network algorithm to forecast the performance of a container running an application based on the performance data at different time intervals. The computing platform feeds usage of CPU, memory, and I/O for containers or applications into the LSTM algorithm for a resolution.

In some implementations, the computing platform determines a future workload by examining the usage history at different time resolutions. Each resolution can provide different repeatable patterns that are captured separately. For example, applications may have daily repeatable patterns, while others may have weekly or monthly repeatable patterns. To determine different weekly patterns, the computing platform can run prediction algorithms at different time resolutions (e.g., 1 minute, 30 minutes, 1 hour, 12 hours, 24 hours, or longer).

At decision operation 320, the computing platform transmits control instructions to the cluster that cause the container to scale up, scale down, shutdown, or migrate to another VM based on the forecasting operation 315. For example, if the forecasting operation 315 predicts a container will experience double the workload in long term, the decision maker can send instructions to the cluster to double its processing power or double its memory. Alternatively, the computing platform 105 can determine that a container has a required operation resources beyond what is possible on its host VM, in such a case, the computing platform 105 can send instructions to move the container to another VM, where the instructions include a command to increase the memory or processing power of the container. In such a case, the new host VM has the capability to host the enlarged container. The decision maker 245 also computes SLA agreement factors when making its decision. For example, if the SLA agreement requires that a container have a certain latency, the decision maker 245 can determine that based on the forecast of a container and its required latency, the container needs have more resources (e.g., a larger processor).

Additionally, the computing platform 105 determines the cost of scaling or moving a container or adjusting a VM. The computing platform 105 can reduce (e.g., optimize) the cost of scaling applications and containers based on using cost optimization algorithms and the forecasting data. For example, the computing platform 105 can use a Kalman filter, Double Exponential Smoothing, or Markov Chain. The computing platform 105 can also use evolutionary algorithms such as a Genetic Algorithm, Particle Swarm, or Ant Colony.

Additionally, the computing platform 105 can determine whether a change is permanent or temporary. For example, if the cost of opening a new VM or new container is high, the computing platform can determine to open the new container or new VM to cover a short period of high demand and then shut down or close the new container or VM. Alternatively, if the cost is low or the forecast predicts high demand for a long time, the computing platform can make the new container or VM have a long-life time before an expiration (e.g., several weeks). However, the computing platform 105 can later shutdown a permanent machine if the forecaster determines the demand has changed for the permanent machine.

In some implementations, the computing platform 105 can include a developer input operation. For example, the computing platform 105 can continuously, frequently, or sporadically receive inputs from software developers about the soundness of these decisions. Based on this developer input, the computing platform determines software developer styles to operate an application. Over time the computing platform aggregates from multiple developers and fuses such learning with a current developer's feedback to run an application like what the developer would do without the AI models. For example, the computing platform monitors an application and learns again from after a decision is applied. If a decision has the expected impact, the computing platform stores this information and enforces that decision again if the is under similar circumstances. If not, the computing platform adjusts the machine learning model and find alternative decisions.

The process 300 can be repeated or some operations can be repeated. For example, the computing platform 105 can repeat the receiving performance 310 after it has sent the control instructions. In some implementations, the computing platform 105 runs the process 300 continuously as an application, containers, VMs, and other services are added to a network. Alternatively, the computing platform 105 can run the process 300 in discrete steps and pause between each step, for example, to allow a developer to review the information. The process 300 can be stored in a computer-readable medium and executed by a processor or computer. Accordingly, the process 300 can be a computer-implemented method.

CONCLUSION

Reference in this specification to "one implementation" or "an implementation" means that a feature, structure, or characteristic described about the implementation is included in at least one implementation of the disclosure. The appearances of the phrase "in one implementation" or "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but no other implementations.

Some portions of the detailed description may be presented in terms of algorithms and symbolic representations of operations on data bits within a computer memory. These algorithmic descriptions and representations are the means used by those skilled in the data processing arts to convey the substance of their work to others most effectively skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. The algorithms disclosed here in can be the structure to support a function of the disclosed technology. In some implementations, the algorithms are the means for performing an operation. For example, the LSTM or FFNN algorithms can be the means for determining a forecasting value or confidence value for a container.

Discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although the machine-readable medium or machine-readable storage medium is shown in an exemplary implementation to be a single medium, the term "machine-readable medium" and "machine-readable storage medium" should be taken to include a single medium or multiple medium (e.g., a centralized or distributed database, and/or associated caches and servers) that store the one or more sets of instructions. The term "machine-readable medium" and "machine-readable storage medium" shall also be taken to include any medium that can store, encoding or carrying a set of instructions for execution by the machine and that cause the machine to perform any one or more of the methodologies of the presently disclosed technology. A machine-readable storage medium can also be referred to as a computer-readable medium, which generally means a medium that can be read by a computer or computers. Machine-readable storage medium can also include a non-transitory computer readable medium without a propagation signal. The non-transitory computer readable medium can store instructions that can be executed by a processor.

Further examples of machine-readable storage media, machine-readable media, or computer-readable (storage) media include but are not limited to recordable type media such as volatile and non-volatile memory devices, removable disks, hard disk drives, optical disks (e.g., Compact Disk Read-Only Memory (CD ROMS), Digital Versatile Disks, (DVDs), etc.), among others, and transmission type media such as digital and analog communication links.

Moreover, while implementations have been described in the context of fully functioning computers and computer systems, those skilled in the art will appreciate that the various implementations are capable of being distributed as a program product in a variety of forms, and that the disclosure applies equally regardless of the machine or computer-readable media used to affect the distribution. For example, the computing platform can be distributed over computers, VMs, containers, or computing devices (e.g., servers, server networks, or a cluster of servers).

Unless the context clearly requires otherwise, throughout the description and the claims, the words "comprise," "comprising," and the like are to be construed in an inclusive sense, as opposed to an exclusive or exhaustive sense, in the sense of "including, but not limited to," or just "including."

As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application and not to any portions of this application. Where the context permits, words in the above Detailed Description using the singular or plural number may also include the plural or singular number respectively.

The terms computing device, computer, device, network, server, or machine are used throughout this disclosure. Although these terms can reference to physical devices (e.g., including a physical memory and chip), the terms can also refer to virtual computing devices, computers, devices, networks, servers, or machines. The virtual term can mean that another physical device is virtualizing these machines (e.g., a computer has a hypervisor software and runs several VMs on top of its hardware).

The above detailed description of implementations of the disclosure is not intended to be exhaustive or to limit the teachings to the precise form disclosed above. While specific implementations of, and examples for, the disclosure are described above for illustrative purposes, various equivalent modifications are possible within the scope of the disclosure, as those skilled in the relevant art will recognize. For example, while processes or blocks are presented in each order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various implementations described above can be combined to provide further implementations. For example, the disclosed technology can be application to virtual networks, wherein a virtual network includes combining hardware and software network resources and network functionality into a single, software-based administrative entity.

While certain aspects of the disclosure are presented below in certain claim forms, the disclosed technology contemplate the various aspects of the disclosure in any number of claim forms. For example, while only one aspect of the disclosure is recited as a means-plus-function claim under 35 U.S.C. § 112, 916, other aspects may likewise be embodied as a means-plus-function claim, or in other forms, such as being embodied in a computer-readable medium. Any claims intended to be treated under 35 U.S.C. § 112, 916 will begin with the words "means for".

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

What is claimed:

1. A system for managing cloud computing, the system comprising:
   a processor; and
   a memory storing instructions that when executed by the processor provide:
   a cluster scanner configured to scan a cluster and receive scanned information associated with the cluster,
   wherein the cluster includes a container running an application on a host virtual machine (VM);
   a feature extractor configured to extract features from the cluster based on the scanned information, wherein the extracted features include name, memory size, processing power, and input/output configuration information for the container running the application;
a performance data monitor configured to receive performance data associated with the container,
wherein the performance data relates to performance of memory utilization of the container, processing power utilization of the container, input/output utilization for the container, and a performance measure parameter of the container while running the application;
a resolution adjuster configured to adjust a first resolution of an interval of the performance data by calculating average data points from the performance data and downsampling the first resolution into a second resolution that is longer than the first resolution;
a forecaster configured to predict first and second forecast values of the container, based on the performance data, the first resolution, and the second resolution,
wherein the resolution adjuster is further configured to:
calculate a first confidence value, at the first resolution, and a second confidence value, at the second resolution, each of the first resolution and second resolution measuring a likelihood that each respective forecast value matches the performance data of the container running the application;
compare the second confidence value, at the downsampled second resolution, to a confidence threshold;
in response to the comparison, determining that the second confidence value reaches or exceeds the confidence threshold; and
providing the second confidence value as an optimal confidence value;
the forecaster further configured to determine corresponding container requirements, based on the optimal confidence value; and
a decision maker configured to automatically transmit control instructions to the cluster; based on the optimal confidence value retrieved from the forecaster and corresponding container requirements determined by the forecaster,
wherein the control instructions cause the container to scale up, scale down, shutdown, or migrate to another VM, and
wherein the control instructions are based on the forecast value received from the forecaster.

2. The system of claim 1, wherein the resolution adjustor is further configured to downsample the performance data to a third and fourth resolution.

3. A non-transitory computer-readable medium storing instructions that, when executed by a processor, cause a machine to perform operations, the operations comprising steps to:
scan a cluster,
wherein the cluster includes a virtual machine (VM) and a container, and
wherein the VM is hosting the container and the container is running an application;
extract features from the cluster based on the scan,
wherein features include name, memory size, processing power, and input/output configuration information for the container running the application;
receive performance data from the cluster,
wherein the performance data relates to memory utilization, processor utilization, input/output utilization, and a performance measure parameter of the container while running the application;
adjust a first resolution of an interval for the performance data,
wherein adjusting the first resolution of the interval comprises adjusting the first resolution by calculating average data points from the performance data and downsampling the first resolution into a second resolution that is longer than the first resolution;
predict first and second forecast values of the container, based on the performance data, the first resolution, and the second resolution;
calculate a first confidence value, at the first resolution, and a second confidence value, at the second resolution, each of the first resolution and second resolution measuring a likelihood that each respective forecast value matches the performance data of the container running the application;
compare the second confidence value, at the downsampled second revolution, to a confidence threshold;
in response to the comparison, determining that the second confidence value reaches or exceeds the confidence threshold; and
providing the second confidence value as an optimal confidence value;
determine corresponding container requirements, based on the optimal confidence value; and
automatically transmit control instructions to the cluster based on the optimal confidence value retrieved from the forecaster and corresponding container requirements determined by the forecaster,
wherein the control instructions cause the container to scale up, scale down, shutdown, or migrate to another VM, and
wherein the control instructions are based on the forecast value received from the forecaster.

4. The non-transitory computer-readable medium of claim 3, wherein the adjusting the first resolution further includes downsampling the performance data to a third or fourth resolution.

5. A method for managing cloud computing:
scanning a cluster,
wherein the cluster includes a VM and a container, and
wherein the VM is hosting the container and the container is running an application;
extracting features from the cluster,
wherein the features include name, memory size, processing power, and input/output configuration information for the container running the application;
receiving performance data from the cluster,
wherein the performance data relates to memory utilization, processor utilization, input/output utilization, and a performance measure parameter of the container while running the application;
adjusting a first resolution of an interval for the performance data,
wherein adjusting the first resolution of the interval adjusting the first resolution by calculating average data points from the performance data and downsampling the first resolution into a second resolution that is longer than the first resolution;
predicting first and second forecast values of the container, based on the performance data, the first resolution, and the second resolution of the performance data;

calculating a first confidence value, at the first revolution, and a second confidence value, at the second resolution, each of the first resolution and second revolution measuring a likelihood that each respective forecast value matches the performance data of the container running the application;

comparing the second confidence value, at the downsampled second resolution, to a confidence threshold;

in response to the comparison, determining that the second confidence value reaches or exceeds the confidence threshold;

providing the second confidence value as an optimal confidence value;

determining corresponding container requirements, based on the optimal confidence value; and automatically transmitting control instructions to the cluster based on the optimal confidence value retrieved from the forecaster, and corresponding container requirements determined by the forecaster, wherein the control instructions cause the container to scale up, scale down, shutdown, or migrate to another VM, and wherein the control instructions are based on the forecast value received from the forecaster.

6. The method of claim 5, wherein the adjusting the first resolution further includes downsampling the performance data to a third or fourth resolution.

\* \* \* \* \*